United States Patent [19]

Tsutsumi

[11] Patent Number: 4,503,313
[45] Date of Patent: Mar. 5, 1985

[54] RELATIVELY ADJUSTABLE LASER AND OPTIC SYSTEM FOR LASER PROCESSING

[75] Inventor: Akira Tsutsumi, La Mirada, Calif.

[73] Assignee: Amada Engineering & Service Co., Inc., La Mirada, Calif.

[21] Appl. No.: 364,269

[22] Filed: Apr. 1, 1982

[30] Foreign Application Priority Data

Apr. 7, 1981 [JP] Japan ................. 56-051311
Apr. 17, 1981 [JP] Japan ................. 56-057301
Apr. 28, 1981 [JP] Japan ................. 56-063323

[51] Int. Cl.³ .......................... B23K 9/00
[52] U.S. Cl. .................. 219/121 LG; 350/6.1; 219/121 LV; 219/121 LQ
[58] Field of Search ............. 219/121 LU, 121 LV, 219/121 LY, 121 LZ, 121 L, 121 LQ; 29/620; 350/6

[56] References Cited

U.S. PATENT DOCUMENTS

3,549,733 12/1970 Caddell ................. 219/121 LU
4,110,640 8/1978 Ito ........................ 219/121 LU
4,190,759 2/1980 Hongo et al. ........... 219/121 LU

FOREIGN PATENT DOCUMENTS

0063699 6/1978 Japan ................... 219/121 LU
2040074 8/1980 United Kingdom ... 219/121 LU

*Primary Examiner*—M. H. Paschall
*Attorney, Agent, or Firm*—Wigman & Cohen

[57] ABSTRACT

The present invention relates to an adjustable laser and optic system for processing which includes a laser beam cutting machine for focusing a laser beam including a first base for supporting an overhead beam by a post, the overhead beam having a laser beam conduit, a mirror assembly and a condenser lens for focusing the laser beam. A laser generator is supported on a second base for generating and feeding the laser beam to the laser cutting machine. Thg laser generator has a laser beam outlet arranged in alignment with the axis of the beam conduit in the overhead beam such that the laser beam generated is delivered to the mirror assembly in a straight line. Also provided is an element for connecting the first base and the second base, and an adjustment device associated with the second base for horizontally adjusting the laser generator in relation to the cutting machine, and a workpiece positioning device mounted on the first base for feeding the workpiece to the processing zone.

11 Claims, 12 Drawing Figures

RELATIVELY ADJUSTABLE LASER AND OPTIC SYSTEM FOR LASER PROCESSING

BACKGROUND OF THE INVENTION

1. Field of the Invention

The present invention relates to laser processing machines which can process sheet-like workpieces such as sheet metals by various methods such as cutting and piercing by use of laser beams produced by laser resonators.

2. Description of the Prior Art

As is well-known, a laser beam is widely used in industries to process a variety of metallic and nonmetallic materials such as irons, nickels, plastics, rubbers and glasses.

Generally, a laser processing machine comprises a laser generator for generating the laser beam and a laser beam cutting machine having a processing head assembly to apply and focus the laser beam from the laser generator. The laser beam cutting machine has a worktable and workpiece positioning means on the worktable.

Heretofore, however, in a laser processing machine of the above-described type, the laser generator and the laser beam cutting machine are indpendent construction, as evidenced for example by the disclosures in U.S. Pat. No. 4,088,865 entitled "Laser Beam Welding Apparatus", filed on Jan. 2, 1976. Therefore, the laser beam from the generator is directed through a complicated mirror assembly to the laser beam cutting machine. This arrangement is considered to cause for an optical center deviation of the laser beam. The optical center deviation are arised by a thermal deformation of the mirror assembly and the different vibration between the laser generator and the laser beam cutting machine. Thus, the maintenance and adjustments of the mirror assembly are required and they involves considerable time and handling.

Furthermore, in order to perform an accurate and fine processing for producing intricate shape products, it is necessary to exactly adjust the workpiece positioning means according to predetermined procedure. However, it is sometimes difficult for operating personnel to make the exact and complex adjustment. It has been also conventionally disadvantageous that the laser processing machines are not provided with a scaling or enlarging function mechanism in a cutting shape. Thus, when the scaling or enlarging process is required, operating personnel have to load the geometric data of the workpiece to be cut to a control device.

Furthermore in a conventional laser processing machine, a focus point of the laser beam is set slightly under the top surface of any workpiece with the same thickness. Therefore, when the laser processing condition is changed, for example, from cutting to piercing, it is extremely difficult to perform an accurate and fine processing.

SUMMARY OF THE INVENTION

A general object of the present invention is the provision of a laser processing machine which obviates the above-noted problems by incorporating improved means for performing an accurate and fine processing.

Another object of the present invention is the provision of a laser processing machine so arranged to unit construction for eliminating the optical center deviation of the laser beam.

Still another object of the present invention is the provision of a laser processing machine incorporating a laser generator and a laser beam cutting machine in one construction for eliminating the optical center deviation of the laser beam and the complex mirror assembly.

A further object of the present invention is the provision of a laser processing machine so arranging to align the laser beam path in a laser generator with the laser beam path in a laser beam cutting machine for eliminating the complex mirror assembly.

A further object of the present invention is the provision of a laser processing machine incorporating horizontal laser resonator adjustment means for eliminating the optical center deviation of the laser beam.

A still further object of the present invention is the provision of a laser processing machine incorporating workpiece positioning means for automatically and accurately processing the workpiece to intricate shape products.

Another object of the present invention is the provision of a laser processing machine incorporating a scaling or enlarging function mechanism.

A still another object of the present invention is the provision of the method of a laser processing, for performing an accurate and fine processing when the laser processing condition are changed.

Other and further objects and advantages of the present invention will be apparent from the following description and accompanying drawings which, by way of illustration, show a preferred embodiment of the present invention and the principle thereof.

DESCRIPTION OF THE PREFERRED EMBODIMENTS

Figure 1:
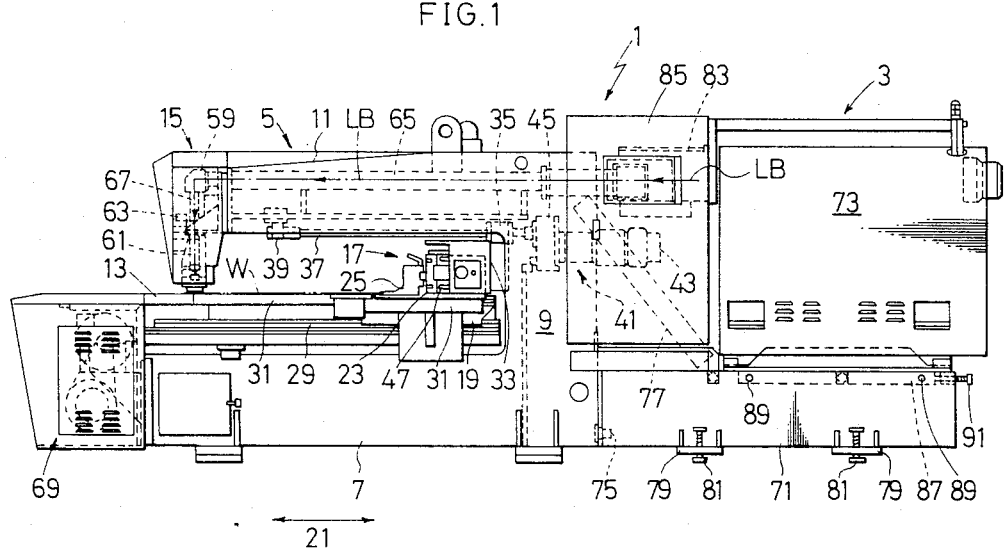
FIG. 1 is a side elevational view of a laser processing machine embodying the principle of the present invention.
Figure 2:
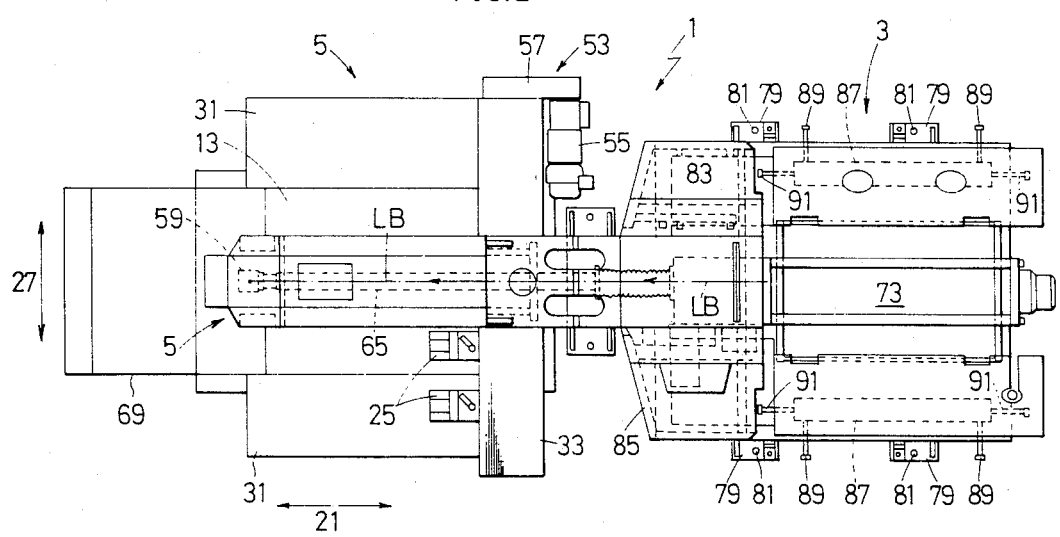
FIG. 2 is a plan view of the laser processing machine shown in FIG. 1.
Figure 3:
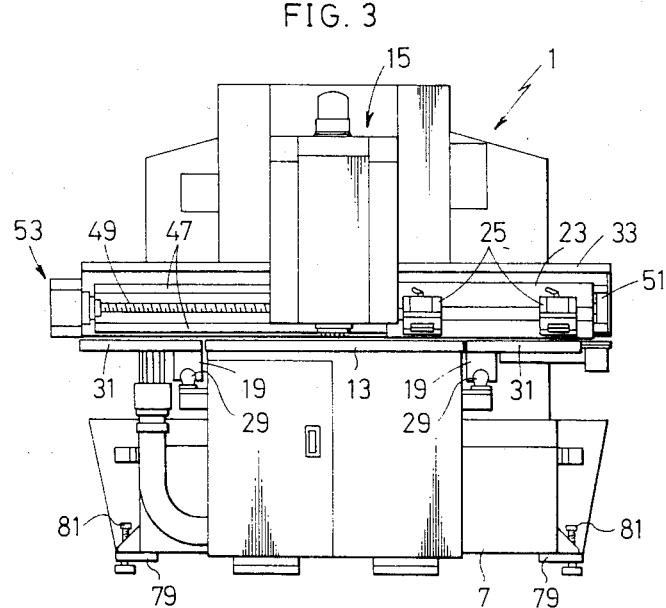
FIG. 3 is a front elevational view of a laser processing machine shown in FIG. 1.

Referring now to FIGS. 1, 2 and 3, there is shown a laser processing machine 1 which is generally designated by the numeral 1. The laser processing machine comprises a laser generator 3 for generating the laser beam LB and a laser beam cutting machine 5.

The laser beam cutting machine 5 comprises a first base 7, a post 9 vertically formed or fixed to the first base 7 and an overhead beam 11 horizontally supported over the first base 7 by the post 9 in a cantilever manner. The first base 7 has a work-table 13 at its top on which a workpiece W such as a sheet metal is horizontally placed to be cut. The overhead beam 11 is provided at its forward end with a processing head assembly 15 and will be described in great detail hereinafter.

In order to feed and position the workpiece W to be cut, the first base 7 includes a workpiece positioning means 17 which is mounted thereon. The workpiece positioning means 17 has a first carriages 19 movable in a Y-axis direction 21 and a second carriages 23 which holds a plurality of clamping means 25 for clamping the workpiece W and is slidably mounted on the first carriages 19 in a X-axis direction 27 perpendicular to the Y-axis direction 21. The first carriages 19 are slidably mounted on a pair of rails 29 which are extended in the Y-axis direction 21 and are fixed on the upper portion of the work-table 13 in parallel with each other.

The first carriages 19 has a pair of movable-tables 31, respectively, which is connected by a connecting beam 33 extended in the X-axis direction 27. The nuts 35 which are fixed to the connecting beam 33 are engaged with the threaded section of a leading screw 37. The screw extends in the Y-axis direction 21 and the one end of it is journalled for rotation into a bearing means 39 fixed on the underside of the overhead beam 11. The other end of the leading screw 37 is connected to a first carriage drive means 41. The first carriage drive means 41 include a Y-axis motor 43 with the output shaft (not shown) connected via a reduction gear assembly 45 to the leading screw 37. Therefore, the first carriages 19 may be moved toward and away from the processing zone just beneath the processing head assembly 15 in the Y-axis direction 21 when driven by the first carriage drive means 41.

The second carriage 23 is slidably supported on a pair of rails 47 which are mounted to the connecting beam 33 being mounted on the first carriage 19, and are extended in the X-axis direction 27 being perpendicular to the Y-axis direction 21. The second carriage 23 is engaged with the threaded section 49a of a leading screw 49. The one end of the leading screw is journalled for rotation into a bearing means 51 fixed to the one end portion of the connecting beam 33 as shown in FIG. 3. The other end of the leading screw is connected to a second carriage drive means 53 including a X-axis motor 55 connected via a reduction gear assembly 57 to the leading screw. The second carriage 23 may be moved in the X-axis direction 27 with the clamping means 25.

In the above described arrangement, the workpiece W which is gripped by the clamping means 25 can be fed into beneath the processing head assembly 15 by moving the first and second carriages 19 and 23 by the first and second carriage drive means 41 and 53. The first and second carriage driven means 41 and 53 are drived under a numerical control which is preprogrammed, and will be described in great detail hereinafter. Thus the workpiece W, when positioned just beneath the processing head assembly 15, can be automatically cut and pierced.

The processing head assembly 15 is vertically fixed to the front end of the overhead beam 11. The processing head assembly includes a mirror assembly 59, a movable tube member 61 having a condenser lens (not shown), a tube member adjustment motor 63 and a tube member adjustment means. A conduit 65 is horizontally disposed through the overhead beam 11 and is connected to the mirror assembly 59. Thus, the laser beam LB from the laser generator 3 is delivered to the mirror assembly 59 and is reflected at 90° angle by the mirror assembly 59 and is further transmitted vertically downwardly as is shown by the arrow.

The mirror assembly 59 is downwardly connected to a fixed tube member 67. The movable tube member 61 is vertically connected to the lower end of the fixed tube member 67 in a telescopic manner. The laser beam LB reflected by the mirror assembly 59 is downwardly transmitted through the fixed and movable tube member 67 and 61 and is focused by the condenser lens fixed to the movable tube member 61. Thus, the condenser lens can be moved with the movable tube member 61 to change the focal position of the laser beam LB by the tube member adjustment means. The tube member adjustment means includes a nut member engaged with the threaded section of the movable tube member 61 and a gear assembly connected to the nut member, however it is not limited in this arrangement. The tube member adjustment motor 63 is driven under a numerical control which is preprogramed.

The dust collecting unit 69 for eliminating the fumes or dross piles is provided at the front end of the first base 7, The laser generator 3 comprises a second base 71 and a laser resonator 73. The second base 71 is securely fixed to the first base 7 of the laser beam cutting machine 5 at the rear end thereof by a connecting means. The laser resonator 73 is mounted on the second base 71.

Thus, the positioning shift of the laser generator 3 is relative to the laser beam cutting machine 5 is not arised. The connecting means includes a connecting member 75 and a elongate connecting member 77. The second base 71 is provided with a plurality of brackets 79 and threaded vertical adjustment members 81 engaged with the brackets 79, respectively, arranged to vertically adjust the second base 71.

The laser resonator 73 has a laser beam outlet 83 at its upper portion from which the laser beam LB is delivered. The laser beam outlet is connected to the conduit 65 of the overhead beam 11 so as to axially align the laser beam outlet with the conduit. The copula of them is covered by a cover member 85. Thus, the laser beam LB from the laser resonator 73 is horizontally delivered to the conduit 65 in the straight line without through the conventional complicated mirror assembly.

A pair of horizontal laser resonator adjustment means 87 are associated with the second base 71 for imparting lateral adjustment to the laser resonator 73 in relation to the first base 7. The horizontal laser resonator adjustment means 87 are provided at the both side of the second base, respectively and include X-axis adjustment members 89 in threaded engagement with the side plates of the second base and Y-axis adjustment member 91 in threaded engagement with the end plates of the second base. The horizontal laser resonator adjustment means are fixed to the laser resonator. Thus, lateral adjustment of the laser resonator in the Y and X-axis directions 21 and 27 are achieved by the adjustment of the X and Y-axis adjustment members 89 and 91. The axial center deviation between the laser beam outlet 83 and the conduit 65 is eliminated by the above-described procedure.

Figure 4:
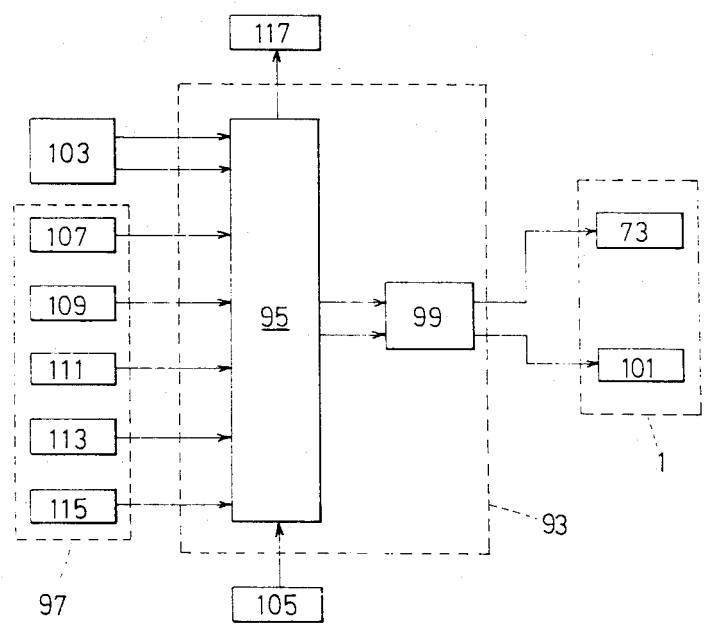
FIG. 4 is a block diagram of a control device.

An explanation is given below to the servo-system including the said Y-axis motor 43 and X-axis motor 55 and to the control device 93 which controls the servo-system and the output level of the laser beam in the laser resonator 73. As shown in FIG. 4, the control device 93 includes the programming device 95 such as a microcomputer which calculates the laser processing program on the basis of various data entered by the input device 97, and the numerical control (NC) device 99 which controls the servo-system 101 including the Y-axis motor 43 and X-axis motor 55 and the output level of the laser beam in the laser resonator 73. It stores various data entered by the input device 97 and calculates a laser processing program on the basis of the various data. The NC device 99 controls the output level of the laser beam in the laser resonator 73 and servo-system 101 according to the laser processing program input from the programming device 95.

Other various data such as profiling data from the profiling device 103 and reader 105 is entered to the programming device 95 in addition to the data of the input device 97. The profiling device 103 uses a tracer to profile the drawing which shows the shape to be processed or the shape of the sample, thereby obtaining the coordinate data of the X and Y-axes for the shape of the drawing, etc. The reader 105 reads various data of the laser processing program and enters them into the programming device 95. The said input device 97 includes the following: a plate thickness data setting device 107 which enters the plate-thickness data of workpiece W; a material data setting device 109 which enters material data of workpiece W; a multiplication-factor data setting device 111 which enters data for magnification or contraction factor of the shape to be worked on; an initial workpiece positioning data setting device 113 which enters data for initial positioning of workpiece W; and a processing condition data setting device 115 which enters data concerning the relation between the output level of the laser beam in the laser resonator device 73 and processing speed of workpiece W. The laser processing program which has been calculated by the said programming device 95 can be given as an output to suitable storage device 117 such as the magnetic disk for storage.

In the above-described arrangement, the programming device 95 calculates the laser processing program on the basis of various data entered from the input device 97, profiling device 103, and reader 105, and outputs the program to the NC device 99. As a result, laser resonator 73 and the servo-system 101 of the laser processing machine 1 is controlled according to the laser processing program. When the multiplication factor of the figure on the drawing is set by using the multiplication-factor data setting device 111, a laser processing program of the figure of the analogous shape is produced and processing of the analogously shaped figure can be easily performed.

When laser processing is performed by the laser processing machine 1 it is important to adjust the focussing position of laser beams LB according to the thickness of workpiece W, but even if the thickness of workpiece W is same, it is important to adjust the focussing position depending on the laser processing conditions.

When laser beams LB are irradiated on workpiece W for piercing or cutting, it is necessary to effectively absorb the irradiated energy to the processing portion and to reduce the effects of the heat on the part other than the portion to be processed. When the thermal effects on the part other than the portion to be processed are too great, the dimensions of the pierced hole and cut groove will be widened. For this reason it is necessary, when laser processing is performed, to focus laser beams LB on a small spot to achieve efficient irradiation of laser beams LB with high energy density. However, the absorption factor of laser beams LB to the surface of workpiece W widely changes depending upon the surface temperature and condition of workpiece W.

The surface temperature is low at the time of piercing when the workpiece W is first pierced and then cut, but at the time of cutting, the surface temperature is maintained at a high level as a result of continuous irradiation of laser beams LB. The surface shape, where laser beams LB is irradiated, also widely changes, and thus there is a great difference between the shape at the time of piercing and that at the time of cutting in the absorption factor of laser beams LB and the thermal effects on the part.

Therefore, one of the most efficient laser processing procedures is to change the focussing position of laser beams LB between at the time of piercing and at the time of cutting, and to proceed with laser processing by adjusting the focussing positions at the suitable points respectively.

An explanation is given to the condition in the middle of piercing operation.

Figure 5:
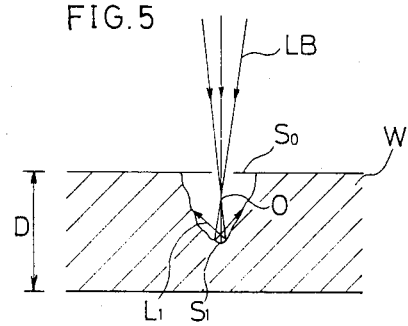
FIG. 5 is an explanatory drawing in piercing process by laser beam.

FIG. 5 is an explanation diagram showing the case when the focussing position O of laser beams is changed from the surface $S_O$ of workpiece W to a position deeper to about $\frac{1}{3}$ of plate thickness D. In this case, the focussing position O has been set too near the surface $S_O$. Thus, when processing progresses deeper than the focusing position O, laser beams LB are irradiated on the part other than the prescribed portion owing to the reflected light $L_1$ from the processed surface $S_1$, resulting in widening of the hole diameter.

Next are shown the results of an experiment on the processing condition, when the focussing position O of laser beams LB was set to various positions.

FIGS. 6a, 6b, 6c and 6d show the schematics of cross sections of experimental samples when they were pierced by changing the focussing position O. In this experiment, steel plates of 6 mm in thickness were used as workpiece W.

Figure 6:
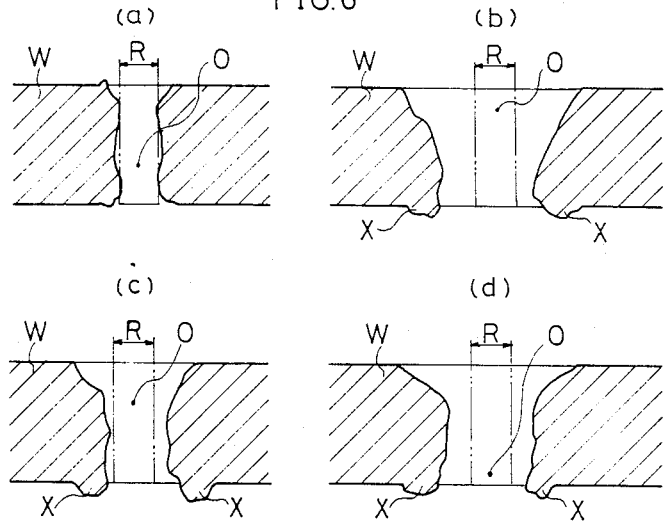
FIGS. 6a, 6b, 6c and 6d are schematic views of shape of holes to be caused when a position of a focal point is modified in piercing by the laser beam.

In FIG. 6a, the focussing position O was set to a position of 4 mm in depth from the surface, and a hole with more or less the prescribed diameter R (1 mm) was pierced. The focusing position O at this time was placed at a depth of $\frac{2}{3}$ of the plate thickness from the surface of workpiece W.

In FIGS. 6b, 6c and 6d, the focussing position O was set to the depths of 1 mm, 2 mm, and 5.5 mm respectively from the surface. In all cases, the diameters at the surface were as large as 3 to 5 mm, thus indicating the widening of the diameters. At the reverse surface of the workpiece W, excessive burrs occurred owing to molten adhesive substances.

Figure 7:
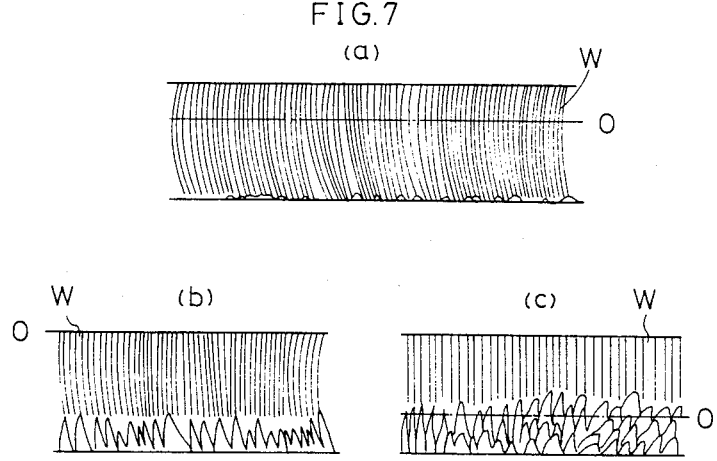
FIGS. 7a, 7b and 7c are schematic views of cut faces to be caused when the position of the focal point is modified in cutting by the laser beam.

FIGS. 7a, 7b and 7c show the schematics of the cross sections of experimental samples when the focussing position O is changed in cutting operation. The same workpiece W as mentioned above was used as a sample.

In FIG. 7a, the focussing position O was set at a depth of 2 mm from the surface, and more or less the prescribed groove was obtained. At this time, the focussing position O was placed at a depth of $\frac{1}{3}$ of the plate thickness from the surface of workpiece W.

In FIGS. 7b and 7c, the focussing position was set to 0 mm and 4 mm deep respectively from the surface. Near the reverse surface, a considerable amount of streaks and continuous dross piles were found. Cut width also was widened.

From the above-mentioned experimental results, it has been found effective to perform laser processing by setting the focal position O of laser beams LB at a depth of about ⅔ of the plate thickness from the top surface $S_O$ of workpiece W for piercing operation and by setting the focal position O to a depth of about ⅓ of the plate thickness from the top surface of workpiece W to be processed at the time of cutting operation.

Namely, in addition to adjusting the focussing position O according to the plate thickness of various types of workpiece W, it is necessary to adjust the focal position O of laser beams LB according to laser processing conditions, by moving up and down the movable tube member 61 with the condenser lens using the tube member adjustment motor 63, in order to achieve more accurate laser processing.

Although a preferred form of the present invention has been illustrated and described, it should be understood that the device is capable of modification by one skilled in the art without departing from the principles of the invention. Accordingly, the scope of the invention is to be limited only by the claim appended hereto.

What is claimed is:

1. A relatively adjustable laser and optic system for laser processing comprising:
   a laser beam cutting machine for focussing a laser beam, including a first base for fixedly supporting an overhead beam by a post, the overhead beam having a laser beam conduit, a mirror assembly and a condenser lens for reflecting and focussing a laser beam;
   a laser generator supported on a second base for generating a laser beam and feeding the laser beam to said laser cutting machine, said laser generator having a laser beam outlet arranged in alignment with an axis of said laser beam conduit in said overhead beam such that the laser beam generated by said laser generator is delivered from said laser generator to said mirror assembly in a straight line;
   a connecting means for connecting said first base and said second base;
   adjustment means associated with the second base for imparting horizontal adjustment to said laser generator in relation to the laser cutting machine; and
   a workpiece positioning means mounted on said first base for feeding a workpiece toward and away from a processing zone beneath said condenser lens.

2. A relatively adjustable laser and optic system for laser processing according to claim 1, wherein said connecting means comprises a connecting member and an elongated connecting means.

3. A relatively adjustable laser and optic system for laser processing according to claim 1, wherein said laser beam outlet of said laser generator and said laser beam conduit in said overhead beam are horizontally disposed.

4. A relatively adjustable laser and optic system for laser processing according to claim 1, further comprising a horizontal laser generator adjustment means associated with said second base for imparting lateral adjustment to said laser generator in relation to said laser beam cutting machine.

5. A relatively adjustable laser and optic system for laser processing according to claim 1 wherein said horizontal laser generator adjustment means associated with said second base adjusts said laser generator in Y- and X-axis directions in relation to said first base.

6. A relatively adjustable laser and optic system for laser processing according to claim 1, wherein said workpiece positioning means comprises a first carriage mounted on said first base for movement thereon in a Y-axis direction toward said processing zone beneath said condenser lens, a second carriage holding a clamping means and mounted on said first carriage for movement thereon in an X-axis direction perpendicular to the Y-axis direction, a first drive means for driving said first carriage, and a second drive means for driving said second carriage.

7. The laser processing machine of claim 6, further comprising:
   an input device, a control device, and a servo-system, wherein said input device feeds various data to the control device, the control device calculates a laser processing program according to the various data from said input device and feeds the laser processing program to the servo-system which controls the workpiece positioning means according to the laser processing program.

8. The laser processing machine of claim 7 wherein; said input device includes a plate thickness data setting device, a material data setting device, a multiplication factor data setting device and an initial workpiece positioning data setting device, and said control device includes a programming device and numerical control device.

9. The laser processing machine of claim 7 or 8 further comprising
   a profiling device for feeding a profiling data to said control device.

10. A relatively adjustable laser and optic system for laser processing comprising:
    a laser beam cutting machine for focussing a laser beam, including a first base for fixedly supporting an overhead beam by a post, the overhead beam having a laser beam conduit, a mirror assembly and a condenser lens for reflecting and focussing a laser beam;
    a laser generator supported on a second base for generating a laser beam and feeding the laser beam to said laser cutting machine, said laser generator having a laser beam outlet arranged in alignment with an axis of said laser beam conduit in said overhead beam such that the laser beam generated by said laser generator is delivered from said laser generator to said mirror assembly in a straight line;
    a connecting means for connecting said first base and said second base;
    a workpiece positioning means mounted on said first base for feeding a workpiece toward and away from a processing zone beneath said condenser lens; and
    a horizontal laser generator adjustment means associated with said second base for imparting lateral adjustment to said laser generator in relation to said laser beam cutting machine;
    wherein said horizontal laser generator adjustment means includes an X-axis adjustment member threadedly engaged with side plates of said second base and a Y-axis adjustment member threadedly engaged with end plates of said second base.

11. A relatively adjustable laser and optic system for laser processing comprising:
    a laser beam cutting machine for focussing a laser beam, including a first base for fixedly supporting an overhead beam by a post, the overhead beam having a laser beam conduit, a mirror assembly and a condenser lens for reflecting and focussing a laser beam;

a laser generator supported on a second base for generating a laser beam and feeding the laser beam to said laser cutting machine, said laser generator having a laser beam outlet arranged in alignment with an axis of said laser beam conduit in said overhead beam such that the laser beam generated by said laser generator is delivered from said laser generator to said mirror assembly in a straight line;

a connecting means for connecting said first base and said second base;

a workpiece positioning means mounted on said first base for feeding a workpiece toward and away from a processing zone beneath said condenser lens; and a horizontal laser generator adjustment means associated with said second base for adjusting said laser generator in Y- and X-axis directions in relation to said first base;

wherein said horizontal laser generator adjustment means includes an X-axis adjustment member threadedly engaged with side plates of said second base and a Y-axis adjustment member threadedly engaged with end plates of said second base.

* * * * *